United States Patent
Bach et al.

(10) Patent No.: US 8,407,224 B2
(45) Date of Patent: Mar. 26, 2013

(54) APPARATUS AND METHOD FOR GENERATING A COLLECTION PROFILE AND FOR COMMUNICATING BASED ON THE COLLECTION PROFILE

(75) Inventors: Dagfinn Bach, Bergen (NO); Sebastian Schmidt, Ilmenau (DE)

(73) Assignee: Bach Technology AS, Bergen (NO)

( * ) Notice: Subject to any disclaimer, the term of this patent is extended or adjusted under 35 U.S.C. 154(b) by 0 days.

(21) Appl. No.: 13/035,083

(22) Filed: Feb. 25, 2011

(65) Prior Publication Data

US 2011/0202567 A1  Aug. 18, 2011

Related U.S. Application Data

(63) Continuation of application No. PCT/EP2009/006042, filed on Aug. 20, 2009.

(60) Provisional application No. 61/092,528, filed on Aug. 28, 2008.

(30) Foreign Application Priority Data

Aug. 28, 2008  (EP) .................................... 08015229
Dec. 18, 2008  (EP) .................................... 08022058

(51) Int. Cl.
*G06F 17/30* (2006.01)

(52) U.S. Cl. ..................... 707/737; 707/748; 705/14.66; 705/50; 705/51; 705/319; 380/1

(58) Field of Classification Search .................. 707/737, 707/748
See application file for complete search history.

(56) References Cited

U.S. PATENT DOCUMENTS

| | | | | |
|---|---|---|---|---|
| 5,524,051 A | * | 6/1996 | Ryan ............................. | 380/237 |
| 5,872,850 A | * | 2/1999 | Klein et al. ...................... | 705/51 |
| 6,020,883 A | * | 2/2000 | Herz et al. ..................... | 715/721 |
| 6,112,186 A | * | 8/2000 | Bergh et al. ................... | 705/7.32 |
| 6,122,617 A | * | 9/2000 | Tjaden .......................... | 704/260 |
| 6,192,340 B1 | * | 2/2001 | Abecassis ..................... | 704/270 |
| 7,756,874 B2 | * | 7/2010 | Hoekman et al. ............. | 707/737 |
| 2004/0098744 A1 | | 5/2004 | Gutta | |
| 2004/0107821 A1 | * | 6/2004 | Alcalde et al. ................. | 84/608 |
| 2005/0038819 A1 | * | 2/2005 | Hicken et al. .............. | 707/104.1 |
| 2005/0251807 A1 | * | 11/2005 | Weel ............................. | 719/310 |
| 2006/0080103 A1 | | 4/2006 | Van Breemen | |

(Continued)

FOREIGN PATENT DOCUMENTS

| | | |
|---|---|---|
| JP | 06-290574 A | 10/1994 |
| JP | 2005-285285 A | 10/2005 |

(Continued)

OTHER PUBLICATIONS

Official Communication issued in International Patent Application No. PCT/EP2009/006042, mailed on Nov. 9, 2009.

(Continued)

*Primary Examiner* — Christyann Pulliam
*Assistant Examiner* — Mellissa M Chojnacki
(74) *Attorney, Agent, or Firm* — Keating & Bennett, LLP

(57) ABSTRACT

An apparatus for generating a collection profile of a collection of different media data items has a feature extractor for extracting at least two different features describing a content of a media data item for a plurality of media data items of the collection, and a profile creator for creating the collection profile by combining the extracted features or weighted extracted features so that the collection profile represents a quantitative fingerprint of a content of the media data collection. This collection profile or music DNA can be used for transmitting information, which is based on this collection profile, to the entity itself or to a remote entity.

12 Claims, 14 Drawing Sheets

U.S. PATENT DOCUMENTS

| | | | |
|---|---|---|---|
| 2007/0300017 | A1 | 12/2007 | Snijder et al. |
| 2008/0021851 | A1 | 1/2008 | Alcalde et al. |
| 2008/0092182 | A1* | 4/2008 | Conant .................. 725/109 |
| 2008/0275904 | A1 | 11/2008 | Breebaart et al. |

FOREIGN PATENT DOCUMENTS

| | | |
|---|---|---|
| JP | 2006-510946 A | 3/2006 |
| JP | 2009-516286 A | 4/2009 |
| WO | 00/45307 A1 | 8/2000 |
| WO | 01/20483 A2 | 3/2001 |
| WO | 2007/057800 A2 | 5/2007 |

OTHER PUBLICATIONS

Meng et al., "Efficient Music Genre Retrieval Based on Peer Interest Clustering in P2P Networks", 2007 International Conference of Intelligent Systems and Knowledge Engineering (ISKE 2007), Oct. 16, 2007, 8 pages, Chengdu, China.

Pampalk et al., "Content-based Organization and Visualization of Music Archives", Proceedings ACM Multimedia 2002, 10th International Conference on Media, Dec. 1-6, 2002, pp. 570-579, Juan-Les-Pins, France.

Yoshii et al., "A Hybrid Music Recommender System based on Probabilistic Integration of User Ratings and Acoustic Features," Information Processing Society of Japan SIG Technical Report, vol. 2006, No. 90, Aug. 8, 2006, pp. 45-52.

Kaji et al., "An Online Music Recommendation System Based on Annotations about Listeners' Preference and Situation," Information Processing Society of Japan SIG Technical Report, vol. 2004, No. 127, Dec. 12, 2004, pp. 33-38.

* cited by examiner

FEATURE VECTORS FOR MEDIA ITEMS

| D | ID | F1 | F2 | F3 | F4 | F5 |
|---|---|---|---|---|---|---|
| 0,93 | 1 | 7 | 4 | 0 | 0 | 7 |
| 0,57 | 2 | 6 | 3 | 2 | 0 | 8 |
| 0,86 | 3 | 1 | 2 | 4 | 0 | 7 |
| 1,43 | 4 | 0 | 2 | 8 | 1 | 9 |
| 1,55 | 5 | 8 | 10 | 1 | 0 | 10 |
|  | Σ/5 | 4.4 | 4.2 | 3.0 | 0.2 | 8.2 |

K1 K2 K3 K4 K5
- raw music DNA: [4.4; 4.2; 3.0; 0.2; 8.2]

→ each DNA component has the same number range as the underlying feature

→ each DNA component corresponds to a specific feature from features F1...F5

- distance between a DNA vector and a DNA:

$$D = \frac{1}{i}\sqrt{(K1-F1)^2 + (K2-F2)^2 + \ldots + (Ki-Fi)^2}$$

- matching, when $D \leq$ predefined distance
- influence of usage behaviour
- weight feature vectors before averaging to increase weight of recently played or often played piece compared to a non-recently played or seldom played piece.

FIG 4A

RESULT LIST OF MATCHING OPERATION

| NO. | MEDIA ITEM ID. | DISTANCE | CONFID. MEASURE |
|---|---|---|---|
| 1 | ... | 0.6 | 72.2% |
| 2 | ... | 1.0 | 54% |
| 3 | ... | 1.1 | 50% |
| 4 | ... | 1.8 | 18% |
| 5 | ... | 2.2 | 0% |
| 6 | ... | 4.1 | 0% |
| 7 | ... | 4.9 | 0% |
| 8 | ... | 5.3 | 0% |
| 9 | ... | 5.9 | 0% |
| ⋮ | ⋮ | ⋮ | ⋮ |

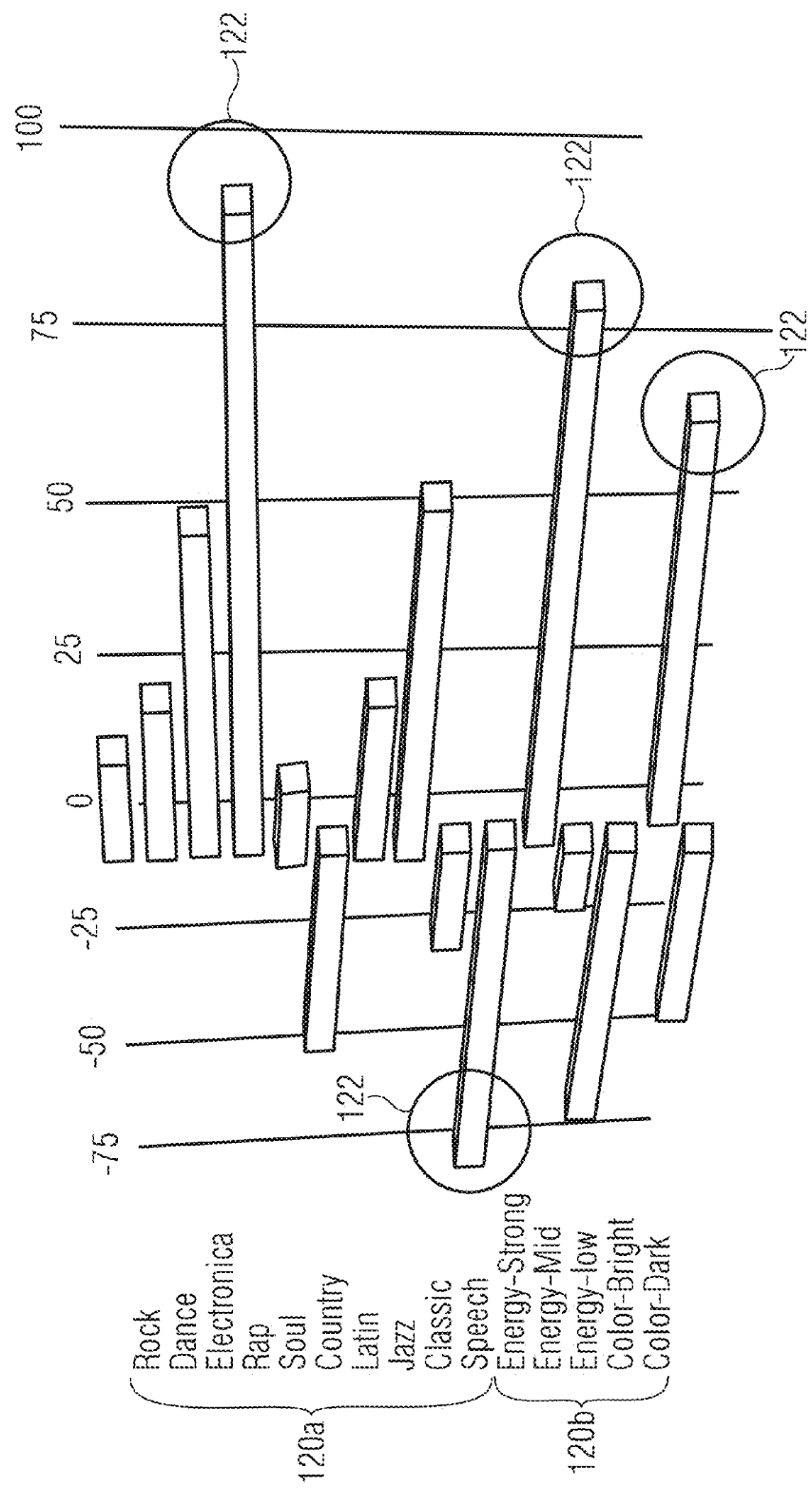

Feature overviews (qualitative and quantitative features)

- Genre, Subgenre
- Speech-/Music discrimination
- Tempo-/Beat determination
- Percussiveness
- Music colour
- Vocal detection
- Aggressiveness
- Segmentation
- Key
- Mood
- Solo Instrument

- ID3 Data
- Soundslike Fingerprint information in header:

— length information for the complete pay load portion or for each feature separately — content charactiristic for each feature, i.e., information on meaning of each feature

APPARATUS AND METHOD FOR GENERATING A COLLECTION PROFILE AND FOR COMMUNICATING BASED ON THE COLLECTION PROFILE

CROSS-REFERENCE TO RELATED APPLICATIONS

This application is a continuation of International Application No. PCT/EP2009/006042, filed Aug. 20, 2009, which is incorporated herein by reference in its entirety, and additionally claims priority from US Provisional Application No. 61/092,528, filed Aug. 28, 2008 and from European Applications Nos. 08015229.1, filed Aug. 28, 2008, and 08022058.5, filed Dec. 18, 2008, which are all incorporated herein by reference in their entirety.

BACKGROUND OF THE INVENTION

The present invention is related to media data processing and, particularly, to media data characterization and usage thereof.

Mobile media data players, such as MP3 players or MP4 players, are becoming more and more popular. Furthermore, due to the high data compression rates obtained by modern audio coding tools, the storage requirements for the individual audio or video files are decreasing. Concurrently, the prices for memories are decreasing as well. These memories can be chip memories or hard disks, which are used in mobile video or audio players. Since the prices for these memories drop more and more, users can store more and more different media data items on their players.

Furthermore, audio and/or video playing functionalities are not restricted to dedicated audio or video players, but are available in even more mobile devices, such as mobile phones, PDAs, navigation devices, etc. Naturally, notebook computers also have full audio/video-playing functionalities and, of course, almost unlimited storage resources due to huge hard disk resources.

In view of that, users store more and more media data items, such as audio files or video files, on their electronic data carriers, and the task for managing these increasing databases is become more and more difficult. Many mobile devices support the ID3 tag, which indicates, for an audio file, the title of the audio file, the author or a band performing the audio file, an album to which the audio file belongs to and, for example, the playing time of the audio file. These information items can be read by a mobile player, can be displayed by the mobile player and can be used for assisting the user in editing playlists, etc.

Furthermore, the MPEG-7 standard has defined the inclusion of additional metadata to audio files. These audio file metadata include additional features related to the audio content of a media data item, such as tempo, beats per minute, etc. These features can be used for characterizing a media data item in a much more content-related way and these features form a basis for finally reaching a search capability among audio files comparable to search functionalities in text files.

The specific selection of a media data item on an electronic storage device represents a very user-specific individual collection, since each user will load different media data items on her or his specific personal electronic storage device. Therefore, a collection of media data items will be a very personal issue characterizing the user of this electronic media data storage device.

SUMMARY

According to an embodiment, an apparatus for generating a collection profile of a collection of different media data items, the media items being audio files, may have: a feature extractor for extracting at least two different features describing a content of a media data item from a plurality of media data items of the collection; and a profile creator for creating the collection profile by combining the extracted features or weighted extracted features for the plurality of media data items so that the collection profile represents a quantitative fingerprint of a content of the collection, wherein the apparatus further has an input for receiving information on a music taste of a user of the collection of different audio files, and wherein the profile creator is operative to create a raw collection profile without information on a user behavior logged by the profile creator or information on a music taste, and to weight the raw collection profile using weights derived from the information on the music taste or the user behavior to obtain the collection profile.

According to another embodiment, an apparatus for generating a collection profile of a collection of different media data items, the media items being audio files, may have: a feature extractor for extracting at least two different features describing a content of a media data item from a plurality of media data items of the collection; and a profile creator for creating the collection profile by combining the extracted features or weighted extracted features for the plurality of media data items so that the collection profile represents a quantitative fingerprint of a content of the collection, wherein the profile creator is operative to weight the extracted features using weights derived from the information on the music taste or the user behavior logged by the profile creator, and to combine the weighted extracted features to obtain the collection profile.

According to another embodiment, an apparatus for communicating information from a first entity to a second entity may have: a collection profile information generator for generating information on a first collection profile of a first collection at the first entity or for generating a second collection profile of a second collection at the second entity, the first or second collection profile representing a quantitative fingerprint of a content of the corresponding collection of metadata files at the first entity or at the second entity, the first or second collection profile being generated by an apparatus for generating a collection profile as mentioned above; and an information handler for using the first collection profile or the second collection profile within a matching operation and for transmitting information based on the matching operation or a collection profile or for receiving a message based on a matching operation or the collection profile.

According to another embodiment, a method of generating a collection profile of a collection of different media date items, the media items being audio files, may have the steps of: extracting at least two different features describing a content of a media date item from a plurality of media data items of the collection; and creating, by a profile creator, the collection profile by combining the extracted features or weighted extracted features for the plurality of media date items so that the collection profile represents a quantitative fingerprint of a content of the collection, wherein the method further has the step of receiving, by an input, information on a music taste of a user of the collection of different audio files, and wherein the step of creating has: creating a raw collection profile without information on a user behavior logged by the profile creator or information on a music taste, and weighting the raw collection profile using weights derived from the information on the music taste or the user behavior to obtain the collection profile.

According to still another embodiment, a method of generating a collection profile of a collection of different media date items, the media items being audio files, may have the steps of: extracting at least two different features describing a content of a media date item from a plurality of media data items of the collection; and creating, by a profile creator, the collection profile by combining the extracted features or weighted extracted features for the plurality of media date items so that the collection profile represents a quantitative fingerprint of a content of the collection, wherein the step of creating has weighting the extracted features using weights derived from the information on the music taste or the user behavior logged by the profile creator, and combining the weighted extracted features to obtain the collection profile.

According to another embodiment, a method of communicating information from a first entity to a second entity may have the steps of: generating information on a first collection profile of a first collection at the first entity or generating a second collection profile of a second collection at the second entity, the collection profile representing a quantitative fingerprint of a content of the corresponding collection of metadata files at the first entity or at the second entity, the first or second collection profile being generated by a method for generating a collection profile as mentioned above; using the first collection profile or the second collection profile within a matching operation; and transmitting information based on the matching operation or a collection profile or receiving a message based on a matching operation or the collection profile.

Another embodiment may have a computer program having a program code for performing a method of generating a collection profile as mentioned above or a method of communicating information as mentioned above, when running on a computer.

The present invention is based on the finding that the very user-specific and, specifically, person-specific collection of media data items on an electronic storage device or, generally, a collection of different media data items owned by a certain user can be advantageously utilized for the purpose of characterizing the owner of the collection of different media data, or, generally, the user of an electronic storage device having stored thereon a collection of different media data. In a first phase, different features describing a content of a media data item are extracted for a plurality of media data items. In a second phase, a profile creator creates the collection profile by combining the extracted features or by combining weighted (e.g. multiplied by a factor different from 1 and different from zero) extracted features of the plurality of media data items so that a quantitative collection profile is obtained, which represents a quantitative fingerprint of a content of the collection.

This quantitative fingerprint, when generated based on audio data, can also be called a "music DNA", since this music DNA individually characterizes the collection of different media data items. Since a collection of different media data items will be different for each person having generated a collection of different media data items, the quantitative fingerprint for each media data collection will be different from quantitative fingerprints from other media data items or other media item collections.

Generally, the inventive collection profile, which is a quantitative fingerprint, fulfills two different and contradicting requirements for a fingerprint. On the one hand, the data amount needed by the fingerprint should be as small as possible so that the storage amount needed for storing a fingerprint is not too high and, even more important, the processing requirements for a usage of this fingerprint within a database, where this fingerprint is to be matched with other corresponding fingerprints to find similar profiles or fingerprints, are the smaller the smaller the fingerprint is.

On the other hand, the fingerprint has to be as characteristic as possible for the item indicated by the fingerprint. To make sure that the fingerprint is characteristic for a user collection, the fingerprint is not derived, for example, by a pure hashing or any other highly lossy compression, but the fingerprint is derived from features representing a content of the media data so that the fingerprint does not represent just the media data files without any further information, but the fingerprint actually represents the content of the media data items rather than, for example, a waveform or a bit structure of media data items.

The inventive collection profile, therefore, provides the ability to be processed by electronic data equipment due to the fact that it is a quantitative fingerprint which, due to its quantitativeness, can be processed within database matching operations etc. On the other hand, the fingerprint is derived from useful content features so that the fingerprint represents the content of a media data collection which, in an embodiment, will be a kind of an average over each separate feature so that the fingerprint consists of a collection or a vector of several averaged different features.

Importantly, the fingerprint does not indicate a certain waveform or a certain bit structure, but indicates the media taste, such as the audio taste or the video taste of the user of the collection of different media data items.

In accordance with the present invention, this collection profile which does not represent a metadata for a single file, but which represents a metadata for a collection of many different media data items, can be used for many different purposes which all have in common that, based on a collection profile and a certain usage of a collection profile within a database application, a certain communication operation of an electronic data processing equipment is conducted so that the user performs a certain action or receives a certain service optimally suited for her or his media taste represented by the collection profile, which can, for example, also be called a music DNA, when the media data items are audio files.

BRIEF DESCRIPTION OF THE DRAWINGS

Subsequently, embodiments of the present invention are explained in detail by referencing the enclosed figures, in which:

FIG. 4a illustrates an exemplary processing of different feature vectors in order to generate a music DNA, and the further processing of the music DNA for the purpose of matching;

FIG. 4b illustrates a result list of the matching operation as obtained from FIG. 4a;

FIG. 4c illustrates a diagram of the distance versus the media item number of a sorted result list for illustrating the mapping of the confidence measure;

FIG. 6 illustrates a schematic representation of a user DNA;

DETAILED DESCRIPTION OF THE INVENTION

Figure 1:
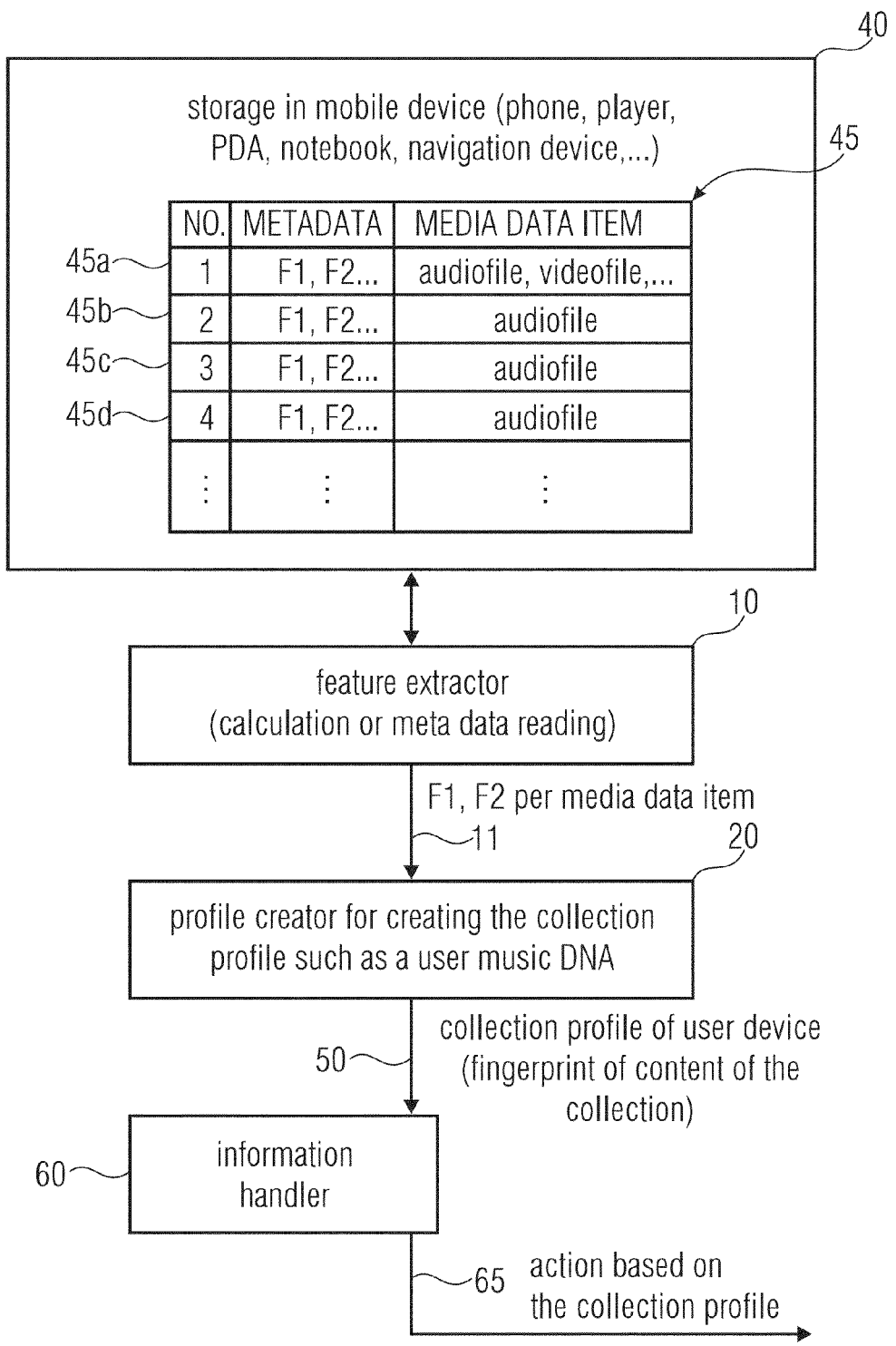
FIG. 1 illustrates a schematic overview of an apparatus for generating a collection profile in accordance with an embodiment of the present invention.

FIG. 1 illustrates in a schematic way an embodiment of an apparatus for generating a collection profile 50 of a collection 45 of different media data items 45a, 45b, 45c, 45d. Advantageously, these media data items are stored within a storage 40 of a mobile device, wherein this mobile device may comprise a mobile phone, an audio data player, a video data player, a personal digital assistant (PDA), a notebook, a navigation device or a similar device having the capability of storing media data files, such as a memory stick, which may or may not have any audio data or video data playing capabilities. Furthermore, the collection may comprise all media data items on a storage device or may comprise only a certain portion of media data items on a storage device or may even comprise the storage elements of several different devices owned by a user, such as a personal computer, a notebook, a mobile player, all owned by one and the same user. When, however, electronic storage devices storing media data items of a user are all synchronized to each other, then it will be sufficient to have only a single device for deriving the collection profile in order to have a very sophisticated user DNA.

The apparatus comprises a feature extractor 10 for extracting at least two different features 11 describing a content of a media data item, for a plurality of media data items of the collection. Therefore, the feature extractor 10 will process one media data item after the other in order to derive, for each media data item, the different features F1, F2, Fi. In one embodiment, the feature extractor 10 is operative to actually analyze the media data item to derive the at least two different features describing the content of the media data item. In other embodiments, the media data items have already associated metadata as indicated at 45 in FIG. 1 so that the feature extractor only has to parse and evaluate the metadata portion of a media data item in order to extract the at least two different features F1, F2 of a single media data item. All the features extracted by the feature extractor 10 are supplied to a profile creator 20 for creating the collection profile. The profile creator combines the extracted features or weighted extracted features for the plurality of media data items so that the collection profile represents a quantitative fingerprint of a content of the media data collection. When the media data files are audio files, then the collection profile is the user music DNA, wherein the term "DNA", which normally means deoxyribonucleic acid in biology, stands for a very individual user-specific characterization of the user's music taste.

The collection profile 50 of the user can be stored for later use or can be transmitted to a different entity via an information handler 60, or can also be used for performing matching operations in a database, where this database may comprise collection profiles of other users or fingerprints for audio data items, where a matching audio data item which best matches the collection profile can be located, etc. Generally, the information handler 60 will perform an action 65 which, in a way, is based on the collection profile in order to provide the user of the collection profile or a different entity, with which the user of the collection profile may communicate, with a certain message/service, etc.

In an embodiment, the profile creator 20 is operative to generate the quantitative collection profile using an addition, a subtraction, a multiplication or a division of the extracted features or of the weighted extracted features. Specifically, features belonging to the same content are combined among themselves, so that the collection profile which is obtained in the end by the profile creator has a number of collection profile components which is identical to the number of features extracted by the feature extractor.

Figure 2:
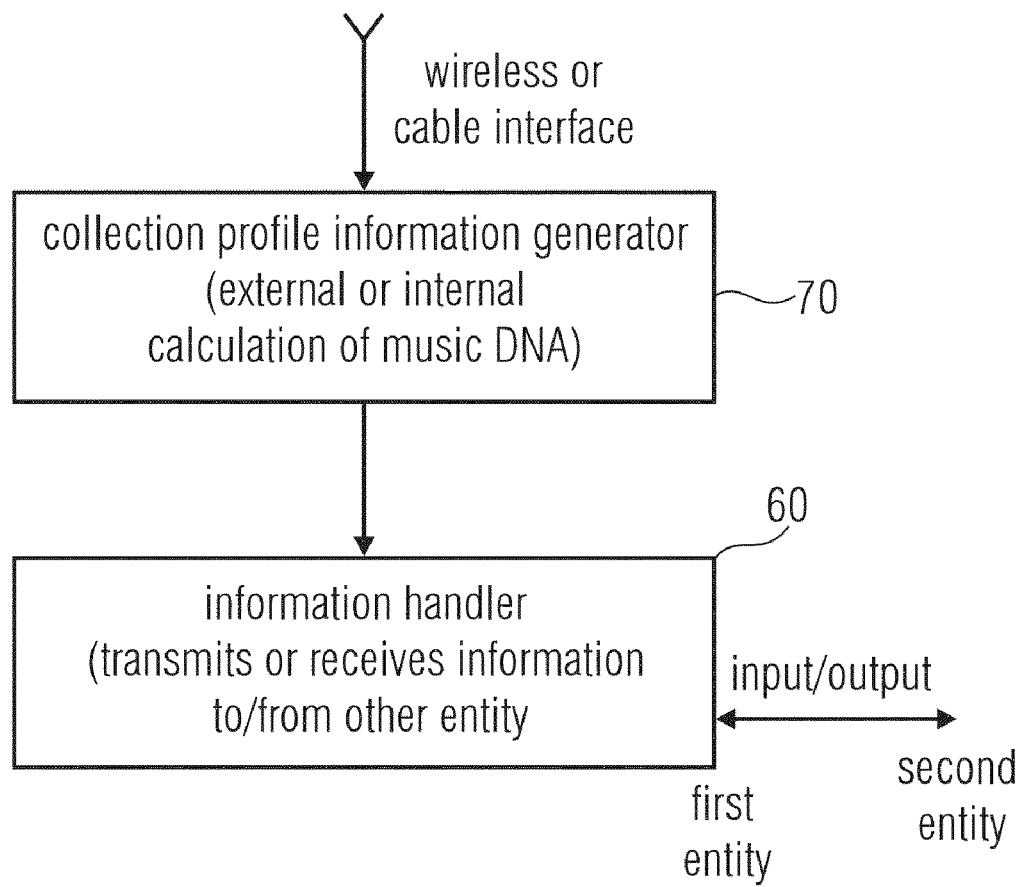
FIG. 2 illustrates a block diagram of an apparatus for communicating information from a first entity to a second entity in a schematic view.

FIG. 2 illustrates an apparatus for communicating information from a first entity to a second entity in accordance with an embodiment of the present invention. The apparatus for communicating comprises a collection profile information generator 70 for generating information on a first collection profile of a first collection at the first entity or for generating information on a second collection profile of a second collection at the second entity. Specifically, the collection profile represents a quantitative fingerprint of a content of the collection. As discussed in connection with claim 1, the collection profile information generator 70 can comprise the same components as the device in FIG. 1. Alternatively, the collection profile information generator 70 can retrieve an earlier generated collection profile from a collection profile storage, where the stored collection profile can be generated by a device in accordance with FIG. 1, which is separate from the collection profile information generator 70 of FIG. 2.

The apparatus illustrated in FIG. 2 furthermore comprises an information handler, which corresponds to the information handler 60 of FIG. 1, since the device 60 in FIG. 2 receives similar input as the corresponding element 60 of FIG. 1. The information handler is operative for transmitting information based on the first collection profile or the second collection profile to the first entity or the second entity. Alternatively, the information handler 60 is operative to receive a message based on the first collection profile or the second collection profile from the first entity or the second entity depending on whether the apparatus for communicating is residing in the first entity or the second entity. Specifically, when the apparatus for communicating illustrated in FIG. 2 is residing in the first entity, a transmission takes place to the second entity and a reception takes place from the second entity. When, however, the apparatus illustrated in FIG. 2 is residing within the second entity, then a transmission to the first entity or a reception from the first entity takes place.

Subsequently, FIG. 3 will be described in more detail in order to show an advantageous sequence of operations to be performed in this or a similar order for outputting a collection profile such as a music DNA.

In a step 81, features for audio files are extracted. The operation performed in step 81 corresponds to the procedure performed by item 10 of FIG. 1. In a step 82, a predefined number of extreme values are deleted. Therefore, in order to make sure that any reading or extraction errors do no influence the final collection profile too much, a number of largest or extreme values from the extracted features of all audio files are deleted.

Figure 3:
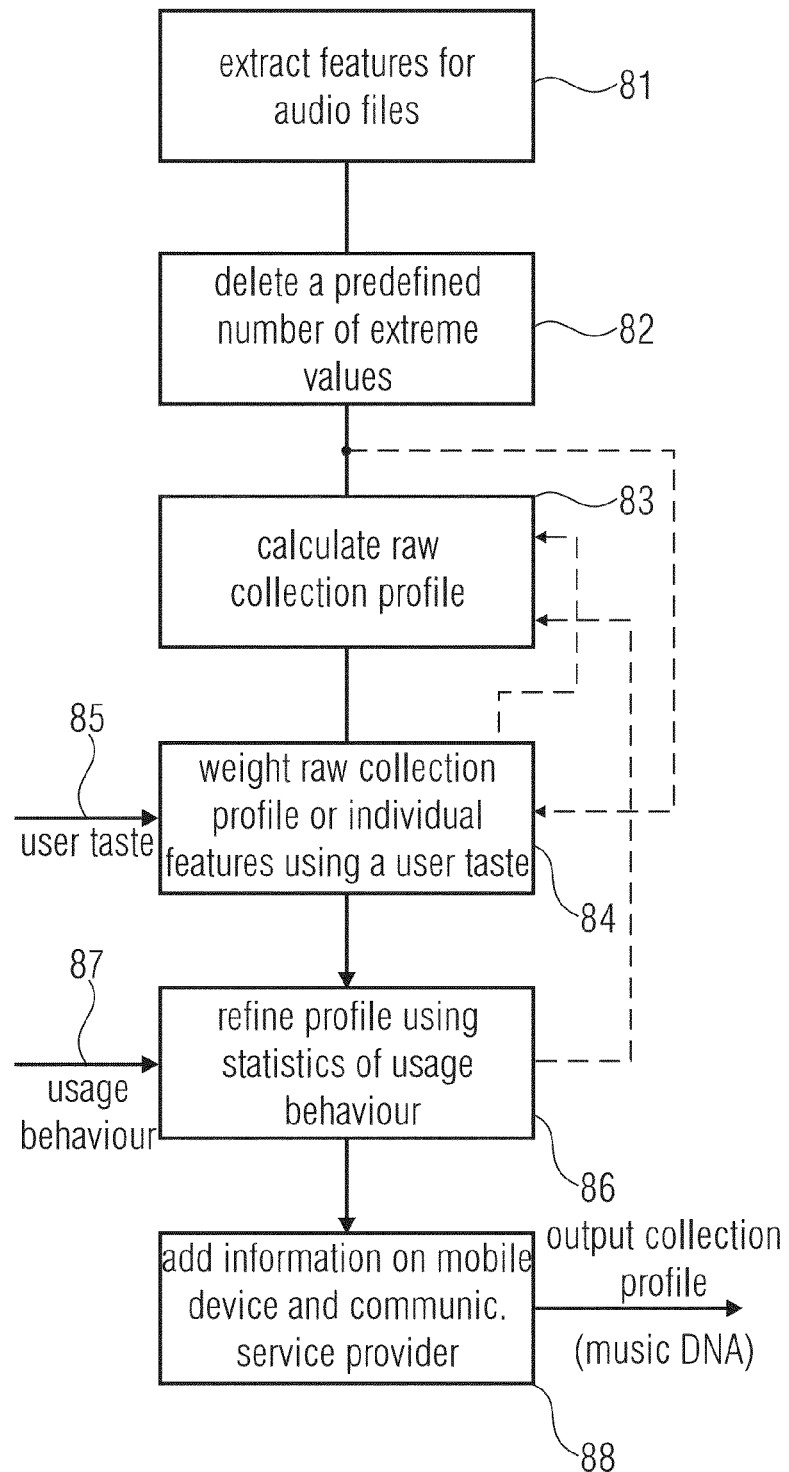
FIG. 3 illustrates a process for generating an output collection profile having information on the media collection and, additionally, information on the storage device storing the media data collection.

Subsequent to the step of deleting indicated at 82 in FIG. 3, a raw collection profile is calculated as indicated at step 83. To this end, the corresponding features of the different audio files are combined to obtain a quantitative raw collection profile subsequent to step 83. Then, in a step 84, the raw collection profile or individual features are weighted in accordance with a user taste input 85. In this embodiment, a user can input some taste specifics, and this is a way that the user can influence his collection profile/music DNA. This weighting can take place with the raw collection profile in a specific way so that a certain taste corresponds to certain weighting factors for different features. Alternatively, the individual features can be weighted before being combined by step 83. Thus, a user can increase the influence of a certain media data item on the user profile by applying a weighting factor larger than 1 to an advantageous media data item and, probably, by applying weighting factors smaller than 1 to all other media data items.

In a further embodiment, the output of step 84 is refined in a step 86 based on statistics of a usage behavior which is input into block 86 via usage behavior input 87. Step 86 makes sure that the collection profile is "living" in that it changes with the changing user habits. Again, the profile refinement based on the statistics of the usage behavior can take place using the raw collection profile at the output of step 83 or the weighted raw collection profile at the output of step 84. Alternatively, as indicated in FIG. 3, the statistics of the usage behavior can be accounted for by weighting extracted features so that a feature vector of a certain media data item which is often used is emphasized with respect to a feature vector of a media data item which is used less times. Additionally, the time from the last usage to the actual time can be accounted for so that the fact that a media data item has been used more recently leads to an emphasizing of this media data item with respect to media data items which have been used not so recently.

The output of step 86 is a specific up-to-date and user-taste-adapted collection profile, which may be improved by adding information on a mobile device and/or a communication service provider as indicated in step 87. Specifically, information on the manufacturer of the device to which the electronic storage device is operatively connected, such as the manufacturer of the mobile phone or the manufacturer of the notebook is added to the user collection and, additionally, information on the communication provider may be added as well in order to provide an output collection profile 89 which is useful for many applications which will be described with respect to FIGS. 5a to 5c.

In a different embodiment, the output of step 83 can be used as it is without any of the additional steps 84, 86, 88. Furthermore, only one or two of the steps 84, 86, 88 can be applied to the output of step 83 in order to provide an output collection profile.

In a further embodiment, the generation of the output collection profile/user DNA is conducted in an automatic way. To this end, an extraction of suitable DNA tags (metadata) from all songs in the collection is performed. Then, the tags are analyzed for similar features and outliers are excluded. Then, the high-level tags are weighted based on the user taste, which advantageously corresponds to the alternative in FIG. 3, in which the individual feature vectors are weighted before being combined. Additionally, the profile is refined by using statistics of the usage behavior. Apart from a time usage, this feature also allows to prefer certain moods to other less advantageous moods.

Subsequently, an exemplary determination of the collection profile is discussed in connection with FIG. 4a. Item 100 illustrates a collection of features extracted for different media data items as indicated at 45 in FIG. 1. Specifically, line 100a illustrates the metadata for five different features F1 to F5 for the first audio file indicated at 45a in FIG. 1. Analogously, item 100b illustrates the extracted features for the second media data item of block 45 in FIG. 1.

The set of media data items, i.e., the collection for which a certain profile is calculated, is represented by the five exemplary media data items in FIG. 4a at 100. It is visible from FIG. 4a that all five features are quantitative features, which are given in a certain value range, which extends between 0 and 10. In the embodiment of FIG. 4a, each quantitative feature has the same value range extending between 0 and 10. In other embodiments, however, the value range for a feature can include negative values as well. Furthermore, the value ranges for different features can be different from each other so that, for example, a first features has a value range between 0 and 100 and a second feature has a value range between −10 and +10, and so on.

For calculating the raw music DNA, i.e., a raw collection profile for the collection 100, the corresponding features F1 for all items are added and an average is calculated. In the exemplary case, where an arithmetic average has been calculated, this operation incurs additions of the individual features F1 and a subsequent division by the number of participants. The result for the first feature is 4.4. Analogously, the averages for the corresponding features F2 to F5 are calculated, and they are, in this embodiment, 4.2, 3.0, 0.2 and 8.2. In one embodiment, the vector of these averages, i.e., the vectors (4.4; 4.2; 3.0; 0.2; 8.2) is the collection profile or music DNA, when the media data items are audio files.

The components of the collection profile correspond to the individual features F1 to F5. Therefore, the collection profile has five components, since five features have contributed to the collection profile. Depending on certain applications, the number of components of the collection profile can be smaller. In this situation, individual components could be averaged so that, for example, the collection profile only has three components, wherein the first component corresponds to an average between the first feature F1 and the second feature F2, the second component corresponds to an average of the third feature F3 and the fourth feature F4, and the third component would correspond to the fifth feature F5.

Furthermore, it becomes clear from the example in FIG. 4a that each DNA component has the same number range as the underlying feature. Since, however, DNA components represent averages between features, the number range of a DNA component could also be smaller than the number range of an individual feature.

In the example of FIG. 4a, where the number of components of the music DNA is identical to the number of individual features used to extract the music DNA, a distance between the music DNA and a vector of features can easily be calculated as indicated at 110. In the embodiment, the distance measure D corresponds to the geometric distance between a certain music DNA and a certain feature vector. Since the feature vectors, i.e., the metadata for a media data item, are quantitative vectors, and since the music DNA is a quantitative vector as well, a quantitative distance measure D can be calculated between each feature vector and a music DNA. An exemplary equation is given at 110, but there can also be applied other distance measures, such as non-quadratic distances, higher order distances, logarithmic distances, etc.

A matching or non-matching decision can be taken when the distance measure D, which is exemplarily calculated at 110, is smaller than a predefined distance. This predefined distance can be set by the user and determines the number of matching hits for a certain search. Additionally, one can also determine a match between the music DNA and a media data item having a feature vector which results in the smallest distance D among all other feature vectors in the set.

The music DNA is specifically useful, since it has a similar appearance as a feature vector. Therefore, the music DNA can be easily compared to a plurality of media data items to find a matching media data item and, alternatively or additionally, the music DNA can be compared to a plurality of different music DNAs. Thus, the matching procedure, when a music DNA is matched with other music DNAs, is identical to the matching procedure, when a music DNA is matched with feature vectors for media data items.

Subsequently, reference is made to column 112, in which the distance measure D between the music DNA of the user and all music items in the user's collection 100 is indicated. When, for example, the predefined distance would be set to 1.0, then media data items 1, 2, 3 would be located as matching items. When, however, the selection would be done in that only the best matching media file will be extracted, then the media data item having the ID number 2 would be selected as the result of the database matching operation.

As discussed in connection with step 84 or 86 in FIG. 3, a usage behavior or a user taste can be used to influence the values, i.e., the components of the music DNA. One way for introducing the usage behavior would be to weight the feature vectors 100a, 100b before averaging to calculate the raw music DNA in order to increase the weight of a recently played or often played piece compared to a non-recently played or seldom played piece.

Alternatively, the different components of the calculated music DNA can be weighted in order to account for a user taste. When, for example, one feature, such as feature F2, represents the percussiveness of an audio piece, and when the user wishes to have pieces having a high percussiveness but, regarding the other features, matching with his music DNA, the user could implement his specific music taste in several ways. One way would be to synthetically increase the percussiveness in each feature vector so that, in the end, the features F2 of the different media data items have a higher value due to the additional weighting/refinement.

Alternatively, the user could increase the percussiveness average, i.e., the value 4.2 at 100 in FIG. 4a to, for example, 8.4. Then, automatically, the distance measure calculation will result in hits having a higher percussiveness. When, for example, the user wishes to have audio pieces selected, which have a percussiveness close to 4.2, the user could influence the distance measure calculation D at 110 in order to weight the second term by a weighting factor higher than 1. Then, the second feature is favored with respect to the other features in the distance calculation and a result of a database matching operation will favor pieces having a good matching second features F2.

In order to favor certain moods of music, several features can be collectively influenced by certain weighting factors. To this end, a table is of advantage in which a certain mood is mapped to certain weighting factors for specific features. Then, the discussed modifications of the feature vectors or the music DNA or the distance calculation can be performed using not only a single factor as discussed, but a collection of advantageously different factors.

Figures 4B, 4C:
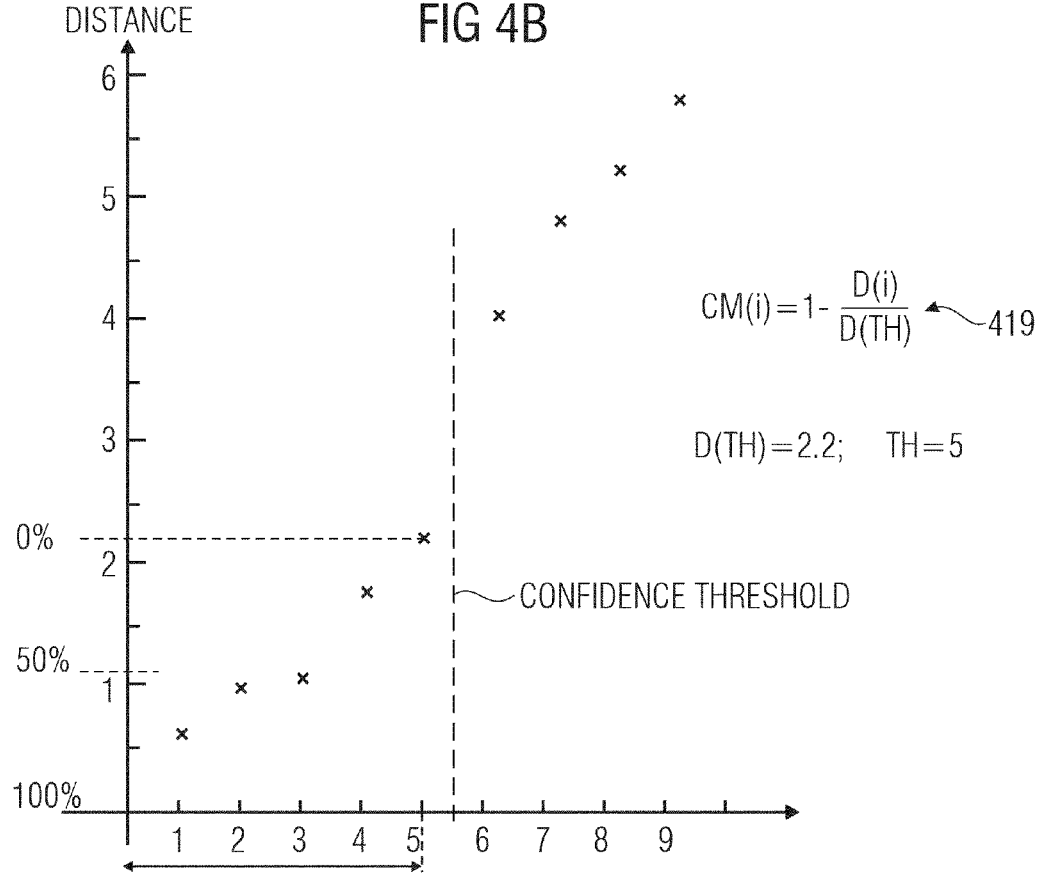

FIG. 4b illustrates the result list of a matching operation which has been performed by using, for example, the matching rule 110 with or without influencing the DNA components or with or without having certain weighting factors in the distance calculation. When a matching operation is performed in the data base 100, a distance is obtained for each media item, and, typically, some media items will match well, and other media items will not match well. Thus, the result list of a matching operation can be given as a sorted list where the media item having the smallest distance will be the first media item and where the media item having the second to smallest distance will be number 2 etc.

FIG. 4c illustrates a plot of the distance versus the number in the sorted result list, and it becomes clear either from the result list in table representation of FIG. 4b or from the result list in the plot representation in FIG. 4c that there is a certain gap between media item 5 and media item 6 with respect to the distance. Specifically, media items between No. 1 and No. 5 have distances between 0.6 and 2.2, which are quite close to each other, while the distance of media item No. 6 is much higher than the distance of media No. 5.

In accordance with the embodiment, a confidence threshold is determined. Generally, for determining this confidence threshold, the change of the distance from one media item in the sorted list to the next media item in the sorted list is determined and, as soon as this change or difference between two adjacent distances is larger than a threshold, a confidence threshold is determined as illustrated in FIG. 4c.

Then, in accordance with this embodiment, a confidence measure is mapped to all media items which have a distance below the confidence threshold, and the confidence measure for all media items, which have a distance above the threshold, is set to 0. This results in a mapping as indicated in the last column of FIG. 4b, and the mapping rule for mapping the confidence measures in this example is indicated as a linear mapping rule.

In other implementations, however, there can also be a compressed or a logarithmic or generally non-linear mapping rule for mapping the confidence measures to media items. Furthermore, the determination of the confidence threshold can be performed based on different criteria such as a mix between a distance increase between two adjacent media items and the number of media items having a distance below the distance, in which the distance increase occurs. Other criteria can include a mix between a distance increase, a number of media items below a suggested threshold and an absolute value of the distance. For example, it can be preset that all media items having a distance below a distance threshold of two receive a confidence measure above 0%. Generally, the confidence measure operation is to free the user from any statistically irrelevant data which are obtained by using the quantitative collection profile. In other words, the user is not interested in any distance measures or in any "hits" in the sorted result list, which have such a high distance that it can be said for sure that the user is not interested in such a media item in the current search. On the other hand, mapping a confidence measure between 0 and 100% will provide the user with a tool which is familiar to the user and which allows the user to quickly determine the usefulness of the results of a matching operation.

Figure 4D:
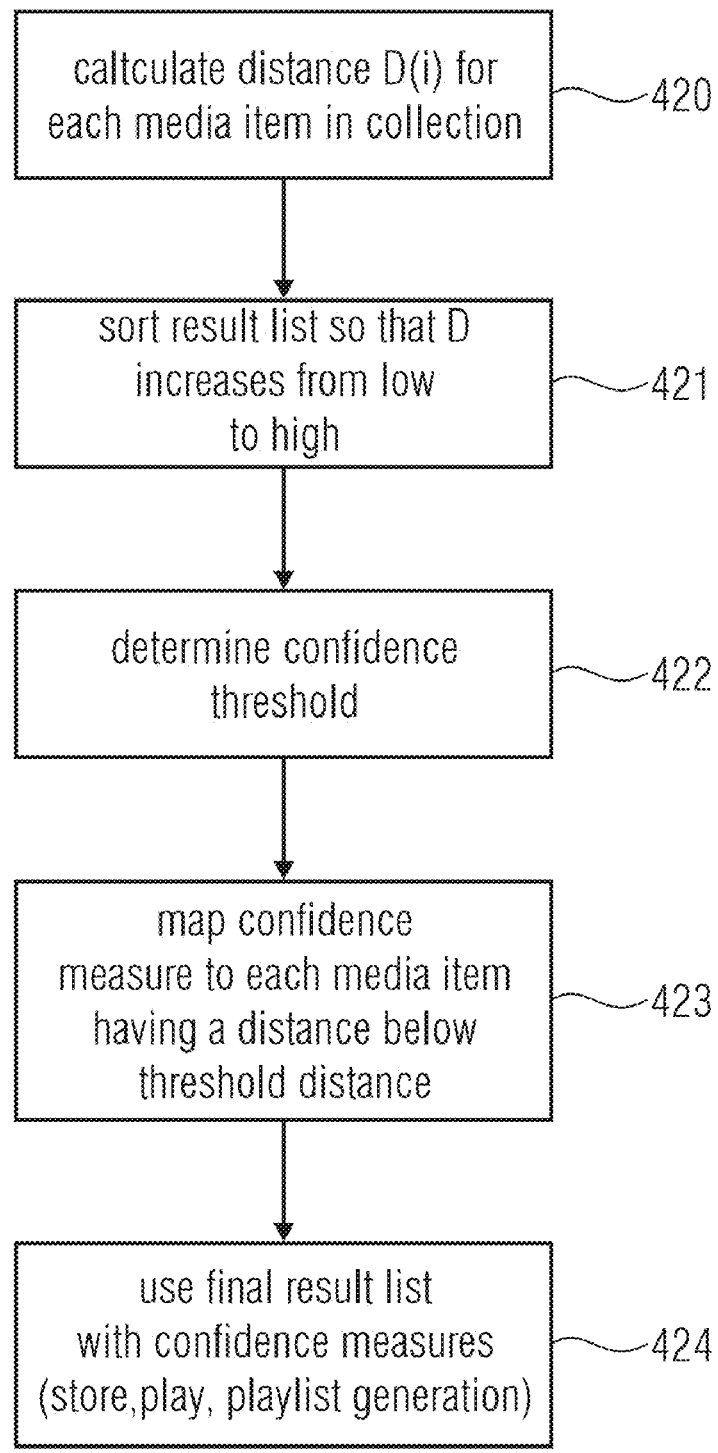
FIG. 4d illustrates a flow chart for illustrating an embodiment of an inventive matching operation, in which confidence measures are used.

FIG. 4d illustrates a flow chart of the procedure which can be implemented as a method or as an apparatus in order to produce the examples of FIGS. 4a, 4b, 4c in a general form.

In step 420, the matching operation comprises the calculation of a distance D(i) for each media item in the collection.

In a subsequent step 421, the result list is sorted so that D(i) increases from low to high as exemplarily indicated in FIG. 4b.

In a step 422, a confidence threshold TH is determined. Furthermore, the distance D(TH) of the confidence threshold TH is determined. In the FIG. 4c embodiment, the confidence threshold TH is equal to 5 which is the current number of the media item, which is equal to or below the confidence threshold. The distance at this threshold is equal to 2.2 in the FIG. 4c embodiment.

In a step 423, a confidence measure is mapped to each media item having a distance below the threshold distance. The linear mapping rule is indicated at 419 in FIG. 4c in order to obtain the confidence measure value for each item i having a number in the result list which is below or equal to a threshold.

In a step 424, the final result list which only includes the media items having a number below or equal to the threshold, where each media item has an associated confidence measure is used. Different usage scenarios for this final result list exist. In a first implementation, the result list can be stored for later use. In a different usage scenario, the result list can be played as it is so that, in a play list, number 1 is played. Subsequently number 2 is played, subsequently number 3 is played etc. This will be done until the first media item having a confidence measure of 0% is played, which is media item Number 5 in the FIG. 4b embodiment. An alternative usage scenario is to perform a random play operation within this final result list so that only media items of this final result list are played, but in a random order which is not influenced by the confidence measure order. A further usage scenario is to use this final result list for any kind of play list generation different from a random play list.

FIG. 6 illustrates an exemplary user DNA, which is a sophisticated user profile which may automatically be generated from the user's music collection. Specifically, the user DNA in FIG. 6 comprises qualitative features 120a, which, in this embodiment, indicate the genre of the audio pieces and, additionally, comprises quantitative features 120b. Therefore, in an embodiment, the quantitative features 102d are used and, additionally, qualitative features 120a are added. Depending on the implementation, specific maximum values 122 can be excluded from a matching operation or can be included. Therefore, a matching operation in a database can be performed without the energy strong feature and the color bright feature or, depending on the user instruction, these extreme values can be used as well.

This feature makes sure that, on the one hand, extraction errors are minimized and, on the other hand, a selection is not completely dominated by a certain dominant feature unless the user wishes to include this dominant feature to a database operation.

Subsequently, advantageous metadata implementations are discussed.

MPEG-7 is providing XML formatted information about content, but in MPEG-7, this data is not directly linked or embedded into the audio content itself. The MP7 file format is closing this gap by combining and embedding both—audio content and describing metadata in order to obtain MPEG-7 enriched files.

Figure 8:
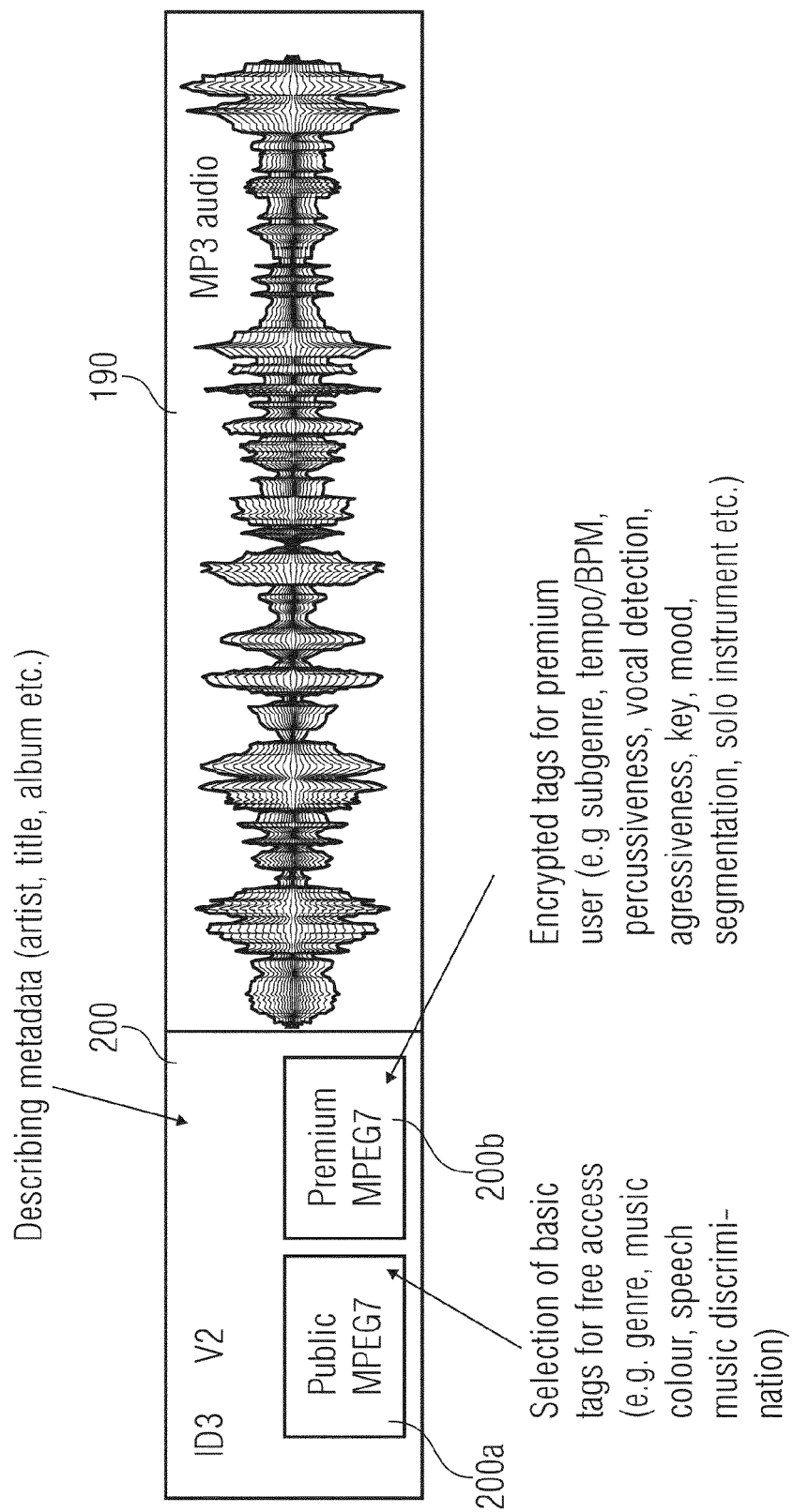
FIG. 8 illustrates a schematic representation of an audio file having associated metadata.

FIG. 8 illustrates an embedding of MPEG-7 data into an MP3 file, an MP4 file (AAC file), a WMA file, an AC3 file, etc.

To this end, an audio content portion 190 is provided as usual and a metadata portion 200 is added. This metadata portion 200 can be an ID3 V2 portion which has a public MPEG-7 part and a premium MPEG-7 part 200a, 200b. The public portion 200a includes a selection of basic tags for free access, such as genre, music color, speech music discrimination. The premium MPEG-7 portion 200b includes additional tags for premium users, such as information on a subgenre and features for tempo/BPM (beats per minute), percussiveness, vocal detection, aggressiveness, key, mood, segmentation, solo instrument, etc. These content-related features have been pre-calculated and entered into the second portion 200b. Advantageously, this second portion 200b is encrypted so that only a premium user, i.e., a user having a certain right to use this portion or having paid for the usage of this portion, can use this portion while a non-premium user can only use the first portion 200a. The public portion, however, includes at least describing metadata, such as artist, title, album, etc.

Generally, a file format in accordance with the present invention comprises an audio recording portion 190, which may be an MPEG audio portion, such as MP3, AAC or WMA. The metadata portion may be in the ID3 V2 (version 2) format, which includes standard metadata, such as artist, title, album, etc.

The public metadata portion 200a is in accordance with MPEG-7 and includes openly accessible metadata stored in MPEG-7 XML for recommendation and advanced navigation, such as genre, music color, speech music discrimination.

The additional metadata portion 200b includes additional metadata going beyond public MPEG-7 metadata. These metadata are stored in public-key encrypted format and can only be accessed by premium subscribers and operators or distributors who have acquired a decryption key.

Depending on the level of access rights, advanced tags, such as subgenre, tempo/BPM, percussiveness, vocal detection, aggressiveness, key, mood, segmentation, solo instrument, etc., and P2P (peer-to-peer) license information are provided, or features which are also enabling tracing of works.

Figure 7:
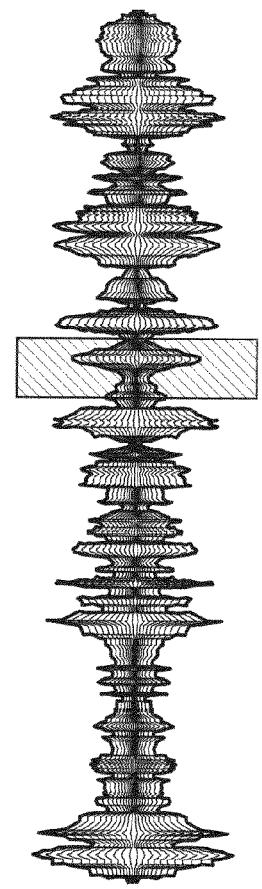
FIG. 7 illustrates a feature overview of qualitative and quantitative features, which can be combined into a user collection profile.

FIG. 7 illustrates a feature overview including qualitative and quantitative features. Qualitative features are genre, subgenre, speech/music discrimination, ID3 data. Quantitative features are tempo/beat determination, percussiveness, music color, vocal detection, aggressiveness, segmentation, key, mood, solo instrument and soundslike fingerprint.

The public MPEG-7 tags indicated at 200a in FIG. 8 are, as stated before, openly accessible metadata stored in MPEG-7 XML format. This portion includes a selection of high-level tags describing a characteristic of a song for advanced search, such as genre, music color, speech music discrimination. This portion 200a furthermore provides the base for a basic tag-based recommendation and advanced navigation. Additionally, information in the portion 200a provide the base for a basic automated playlist generation.

The information included in the premium/second portion 200b includes advanced high-level tags and low-level audio fingerprint information, such as melody, subgenre, tempo/BPM, percussiveness, vocal detection, aggressiveness, key, mood segmentation, solo instrument, etc.

The information in this portion allows a more exact search and navigation than the information in the first portion 200a. Furthermore, the information in portion 200b provides a song segmentation and segment-based search and comparison. It also allows a base for exact recommendation and intelligent playlist generation. Advantageously, the information in portion 200b is stored in a public-key-encrypted format and, thus, can only be accessed by premium subscribers.

Furthermore, different levels of access restrictions can be provided, such as for premium consumers, rights holders, operators, etc. The portion 200b furthermore contains license and sales information, and this portion furthermore enables a peer-to-peer distribution and tracing of works. The sophisticated high-level tags in the second portion 200b can furthermore be used to find cover versions and plagiarism.

Generally, MPEG-7 is a multimedia content description interface, which is a standard for describing the multimedia content data that supports some degree of interpretation of the information meaning MPEG-1 is for storage and retrieval of video and audio on storage media. MPEG-2 is for storage and retrieval in digital television. MPEG-4 codes content as objects and enables those objects to be manipulated individually or collectively. MPEG-7 is a standard for describing features of a content, and MPEG-21 is for digital rights management.

Advantageously, the extraction and generation of an MPEG-7 enriched song is performed by the following main steps.

In a first step, the audio material is decoded and the available ID3 information is imported.

In a second step, the audio material is split into frequency bands and short-time frames.

In a third step, the calculation of low-level features for each frame, such as modulation spectrum, noise likeness, etc., is performed.

In a fourth step, a soundslike fingerprint for low-level recommendation is generated.

In a further step, the song segmentation is calculated via self-similarity information to distinguish chorus, verse, intro and solos.

In a further step, high-level features are calculated based on low-level features either for the whole song or for each segment.

Then, in a final step, the extracted data is embedded into the audio file in order to create an MPEG-7 enriched song. Specifically, the new feature information not already available in the first portion 200a is inserted into portion 200b of FIG. 8.

Figure 10:
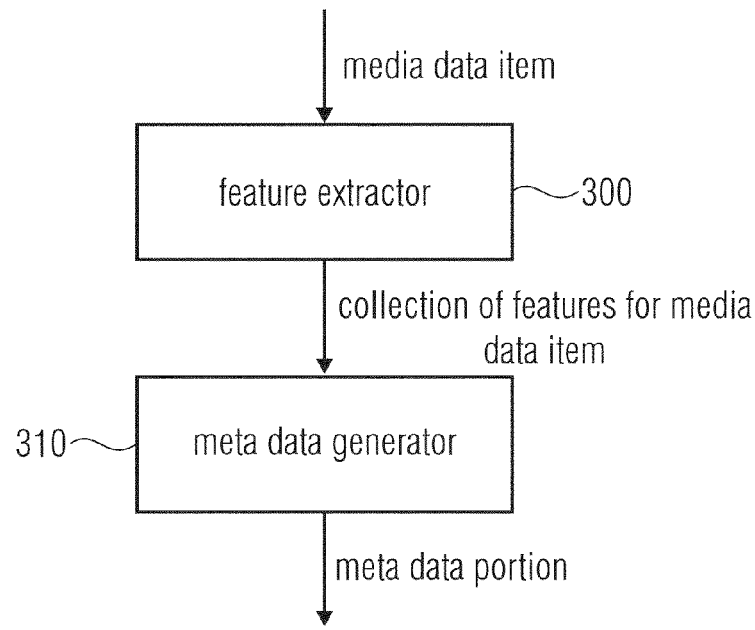
FIG. 10 illustrates a schematic diagram of the apparatus for generating a collection of different media data items.
Figure 11:
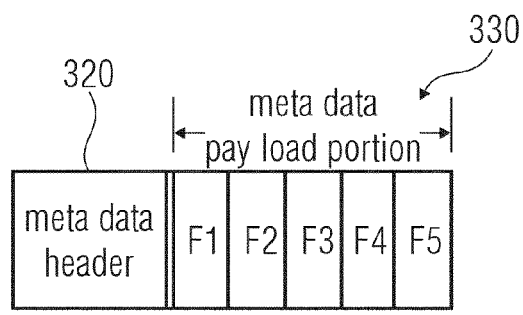
FIG. 11 illustrates the data format of a media metadata portion for a media data item.

Generally, an apparatus for generating a collection of different media data items in accordance with an embodiment of the present invention is illustrated in FIG. 10. The apparatus comprises a feature extractor 300 for extracting, for a plurality of media data items, at least two different features described in a content of a media data item using the media data items. Specifically, the feature extractor can be implemented in order to accurately calculate these features, such as the high-level features as discussed before. Due to the flexibility and variety of these features, the features need a variable amount of bits to be stored in the metadata portion 200. In order to provide flexibility and future adaptability, a metadata generator 310 is provided. The metadata generator generates a metadata portion 200 for each media data item of the plurality of media data items, where the metadata generator is adapted to generate a metadata header 320 as illustrated in FIG. 11, to generate an information on a content characteristic represented by each feature, and to generate a metadata payload portion 330 associated with the metadata header, the metadata payload portion having the at least two different features for the media data item. In the FIG. 11 embodiment, the header 320 therefore comprises the length information for the complete payload portion or comprises, for each feature separately, a separate length information. Other ways to indicate where the information for a certain feature ends and the information for a further feature starts are useful in addition, such as the implementation of synchronization marks, etc.

Furthermore, in order to allow future extension capabilities for adding additional features, information on the meaning of each feature, i.e., feature F1 is, for example, a mood feature and F2 is, for example, an aggressiveness feature, etc., is included as well. This information can be included in a standardized order or can be explicitly included in the metadata header 320.

When FIG. 11 and FIG. 8 are compared, it is to be noted that metadata header 320 and the metadata payload portion 330 can, together, constitute the second portion 200b. Alternatively, the metadata header 320 can be a header relating to the first portion 200a as well as to the second portion 200b. In this case, the second portion 200b would include the metadata header 320, and the information included in the first portion 200a of FIG. 8, i.e., the public tags, would form an additional metadata payload portion which might precede the metadata payload portion 330 or which might follow the metadata payload portion 330 in a certain format.

Advantageously, the metadata header furthermore comprises information on additional fields of the metadata payload portion, which are not illustrated in FIG. 11, i.e., access information, license and sales information or any additional information related to the way how the media data file associated with the metadata information can be used, distributed, etc. In this scenario, the metadata header 320 would include additional length information and description information of such additional metadata payload portion fields as well.

In an embodiment, the feature extractor is operative to detect a newly stored media data item in the collection. Then, the profile creator 20 is operative to retrieve an earlier collected profile and to manipulate the earlier collected profile based on the features of the newly stored media data item to create an updated collection profile. This feature allows to reduce the amount of time and resources for fully calculating a new profile when the user has added a single new item only. In an embodiment, the calculation of the profile takes place in the background, i.e., when the user does not use the device and the device is running in an idle state. This makes sure that as soon as the user wishes to use her or his device, the user can enjoy the full computing capabilities of the device, since the profile calculation is stopped in this case.

Subsequently, reference will be made to FIG. 2 and FIGS. 5a to 5c in order to illustrate a plurality of ways of how the inventive collection profile can be advantageously used for performing a communication between two entities. Generally, as illustrated in FIG. 2, the inventive apparatus for communicating information from a first entity to a second entity comprises the collection profile information generator 70, which actually calculates the collection profile from a collection of metadata items or which receives a readily calculated profile information via a wireless or a cable interface. In the first possibility, in which the collection profile information generator actually calculates the collection profile, the collection profile is from the first entity, when the collection profile information generator is located in the first entity. In the alternative, in which a readily calculated collection profile is received by item 70 via a wireless or cable interface, the collection profile refers to a collection of media data items within a first entity, wherein item 70 is located in the second entity.

The information handler 60 uses the collection profile in order to find a media data item having a matching feature vector or to find a user or a user group having a matching collection profile. In the former case, a collection profile is compared to a plurality of different feature vectors for media data items, where in the second case, a collection profile obtained from item 70 is compared to the plurality of collection profiles of other entities.

Based on this matching operation, information is sent or received, wherein this information not necessarily has to include the matching result or the collection profile but can relate to any product/service or any information related to a product/service determined in response to the collection profile matching operation.

Figure 5A:
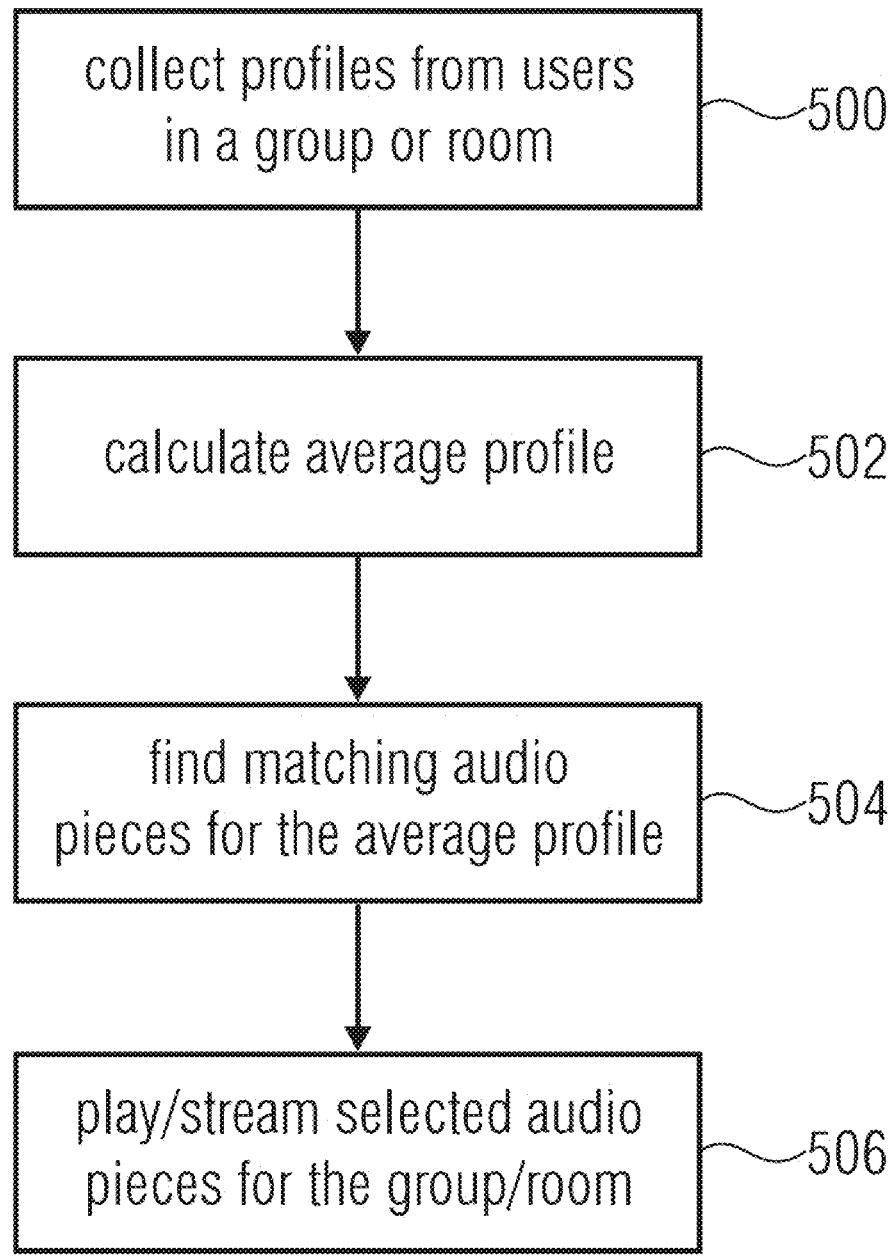
FIG. 5a illustrates a certain usage scenario of the collection profile for the purpose of playing selected audio pieces for a group or a room.

In a certain embodiment, which is illustrated in FIG. 5a, the collection profile information generator resides in a sound processor/generator of an audio listening room, such as a bar, a lobby or anything else, or provides streaming data for a certain Internet user group. Therefore, the collection profile information generator 70 represents a second entity and collects profiles from users in a user group or a room, as indicated at 500. The users in a group or a room represent the first entities.

In a step 502, the device at the second entity represented by the information handler 60 of FIG. 2 calculates an average profile among the profiles from the users received in step 50. Then, based on this average profile, audio pieces are searched in a database, which match with this average profile, as indicated at step 504. Particularly, a database matching operation as discussed in connection with FIG. 4a is performed by using the average profile on the one hand and a collection of feature vectors or an audio database on the other hand in order to find matching audio pieces. Then, in a step 506, the selected audio pieces for the user group or the room are played or streamed, when an Internet user group scenario is considered.

Figure 5B:
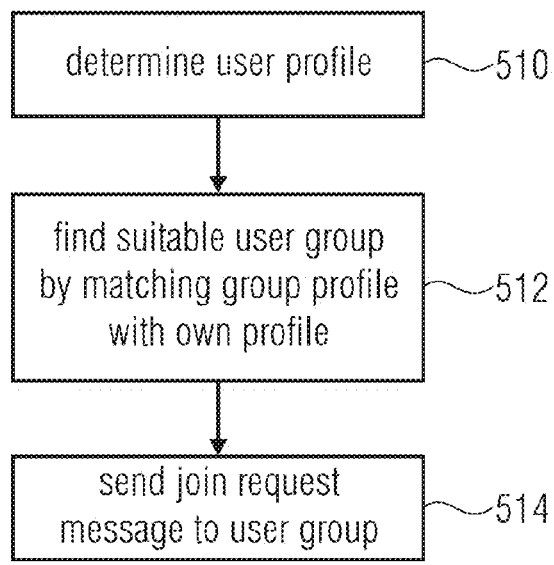
FIG. 5b illustrates an alternative implementation scenario, in which a user can join a user group based on his collection profile.

FIG. 5b illustrates an alternative embodiment for an advantageous usage of the collection profile, where all steps take place in the first entity, i.e., in the user premises. Specifically, the user determines his user profile by analyzing his collection of media data items indicated at 510 in FIG. 5b. Based on his calculated collection profile, the user finds a suitable user group by matching different group profiles with his own profile, as indicated at 512. In this embodiment, the result of the matching operation in step 512 performed by the information handler 60 in FIG. 2 will only output the best matching result, since this is what the user wants to have. In other words, the user wants to join a user group where the other members of the user group have the same or a very similar music taste.

Then, in a step 514, the information handler 60 of FIG. 2, which already performed the operation 512, now sends a join request message to the selected user group, as indicated in step 514. Alternatively, however, the user could send his own user profile determined in step 510 to a remote user group matching service. Then, the determination of the user profile will be performed in the first entity 510 and the user group matching service performed in step 512 will be in the second entity, and the step 514 would be performed in a different way, i.e., that the (with respect to the user) remote second entity will send information on the matching user group to the user.

Figure 5C:
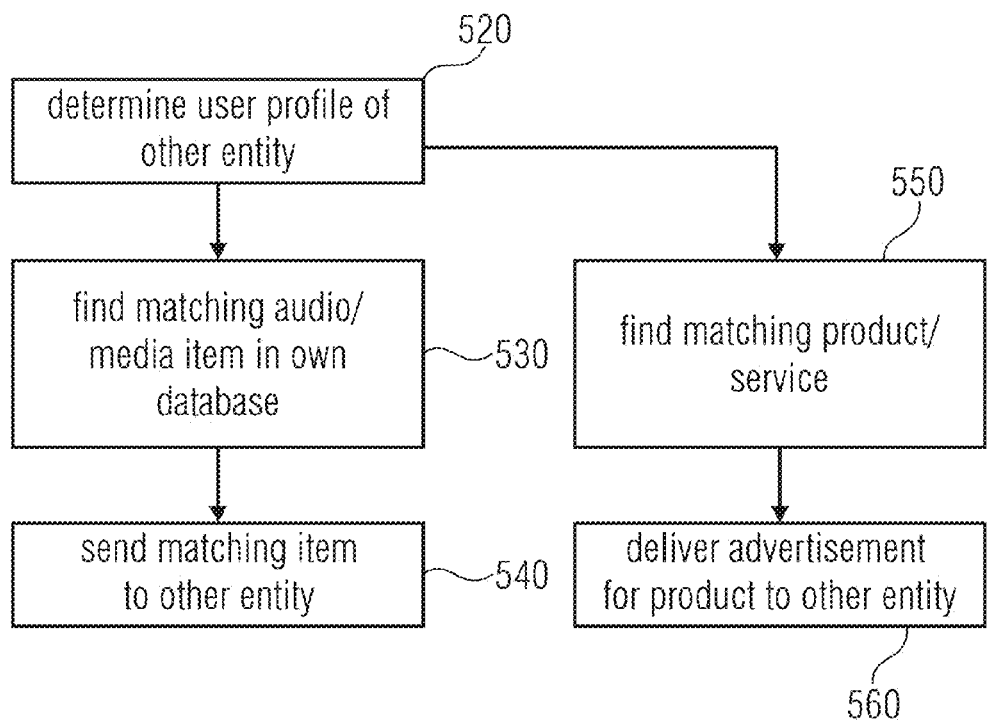
FIG. 5c illustrates an alternative implementation, in which the music DNA of a user is used for providing him with matching media items or with advertisements for products or services related to her or his media data taste.

A further alternative of an advantageous usage of the collection profile is illustrated in FIG. 5c. The steps in FIG. 5c will take place in an entity which is different from the entity from which the user profile comes from. In step 520, a user profile of a different entity is determined such as by wireless or cable transmission. Then, a matching audio/video data item is searched and found in the own database, as indicated in step 530. This step is performed in the same entity in which the user profile of the other entity is received. In a step 540, the matching item found in step 530 is sent to the other entity. This mechanism consisting of steps 520 to 540 may be used for a peer-to-peer distribution of media data items, where the other entity can be sure to receive only a metadata item which fulfils the taste of the other entity due to the fact that the selection was done based on the user DNA of the other entity.

An analogous procedure is illustrated by steps 550 and 560. In step 550, a certain entity may use a user profile of a remote entity for finding a matching product/service for such a user profile. To this end, the information handler 60 of FIG. 2 will perform a matching operation, which may be similar to the matching operation regarding the distance in FIG. 4a, when each available product/service has a certain feature vector. Alternatively, a user profile may be input in a certain function, such as a table lookup in order to find a best-matching product/service.

Then, in step 560, an advertisement for a matching product or a matching service is delivered to the other entity by the information handler 60. Thus, the advertisement pointing to a certain product or service has been determined and forwarded to the other entity based on the user DNA of the other entity.

In accordance with embodiments of the present invention, the inventive collection profile enables new dimensions with community building. The inventive user profile will enable various tailored services, like self-pushing files in a peer-to-peer (super distribution) network, a tailored background for visitors in music bars/clubs and community Internet radio (streaming/prodcasting).

Such Bach DNA communities can become interesting targets for advertisers having products matching the profile of a Bach DNA, as discussed with respect to items 550 and 560 of FIG. 5.

Figure 5D:
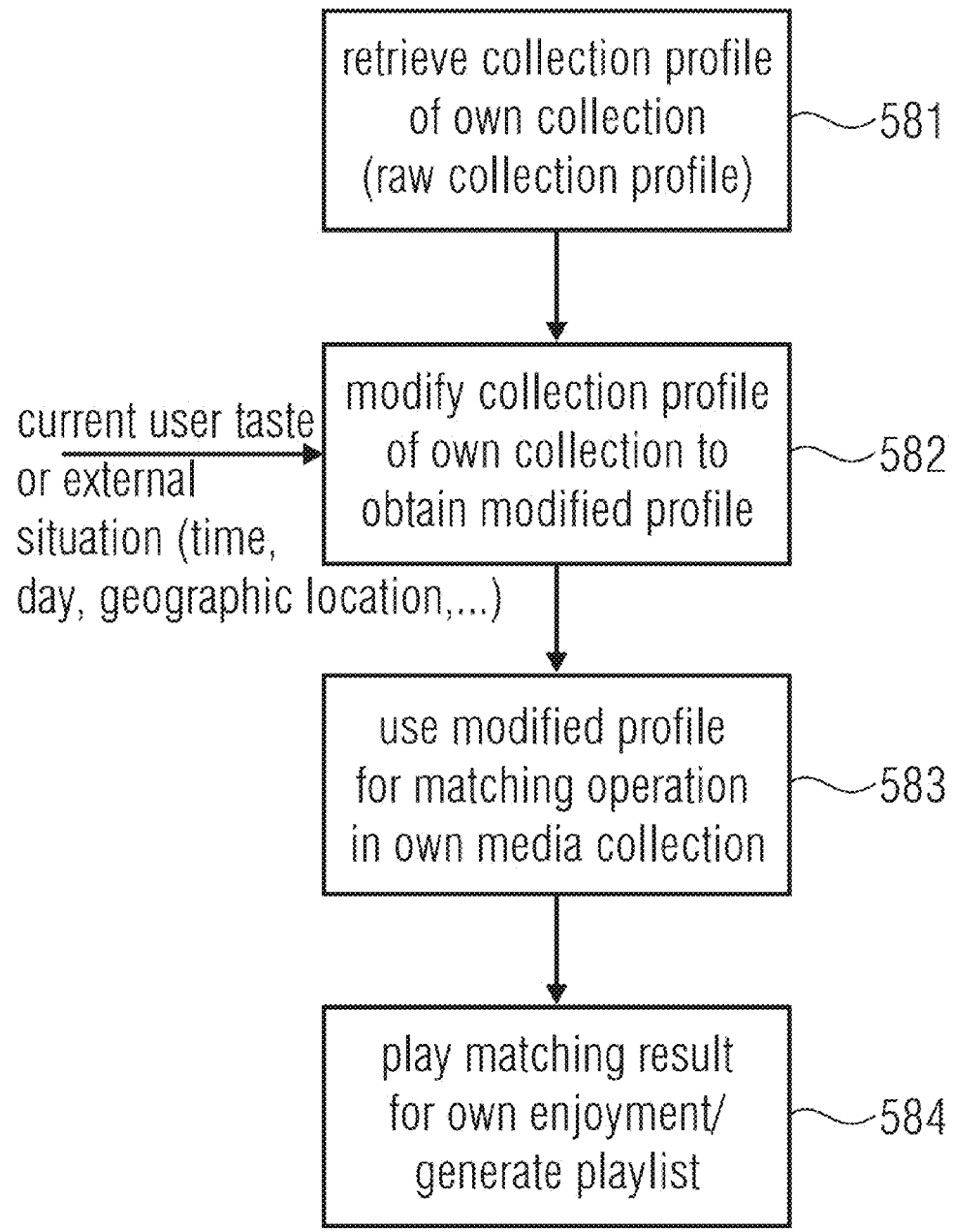
FIG. 5d illustrates an alternative implementation scenario, in which the music DNA of a user is modified in accordance with the current user taste or an external situation, so that the user can find a matching media item from his own profile using the modified collection profile.

In the advantageous usage scenarios described above, the music DNA has been used to influence/trigger/determine a communication message from a first entity to a second entity, where these two entities were users/persons/devices at different geographic locations. FIG. 5d now illustrates an embodiment, in which the user DNA is used by the user herself or himself for generating her or his own play list or, generally stated, by locating a media item which is to be played/rendered for her or his own enjoyment.

To this end, the user retrieves the collection profile of her or his own collection as indicated in step 581. In one implementation, this collection profile is used in a matching operation so that the user finds, from her or his own collection, a media item which has the smallest distance. Alternatively, the user can also determine, from her or his own collection, a final result list as discussed in connection with FIG. 4c where the confidence measures are indicated for this own collection. In this implementation, the information handle 60 of FIG. 1 or the information handle 60 of FIG. 2 will use a music DNA for matching the data base of the user, and the result will be the play list generation or the rendering of a media item from the user's own collection for the enjoyment of the user, i.e., by the user device in which the matching operation has been performed.

In the embodiment illustrated in FIG. 5d, however, the user will modify her or his collection profile of her or his own collection to obtain a modified profile as indicated in step 582. The modification can be performed by the user so that the user can set his current taste. When, for example, the user is in an aggressive mood, then the user can modify her or his raw collection profile so that a more aggressive profile is generated which, however, nevertheless resembles the user's profile. In the end, when a matching operation is performed using this modified profile as indicated in step 583, the user will be in the position to enjoy a media item which is, of course, more aggressive, but which nevertheless conforms with the user's own music taste. Therefore, the user does not just hear an aggressive audio track, for example, but is in the position to hear a very specific audio track which, on the one hand, is more aggressive and which, on the other hand, however, nevertheless has characteristics which conform with the user's general taste.

Other alternatives for modifying the collection profile in step 582 are external situations. An external situation can, for example, be a time of the day so that the music player of the user calculates a different music DNA based on the raw collection profile of step 581, for example for the morning or for example for the evening of a day.

A different external situation can be the day in a week so that, for example, a different modified profile is calculated for a Sunday or a Saturday compared to, for example, a Tuesday or Wednesday.

A further external situation can be a geographic location so that the user's modified DNA is different when the user is, for example, in Europe or in Asia or in the US.

Based on this modified profile, a matching operation in the own media collection is performed as indicated in step 583, and the result of this matching operation is used in the step 584 in order to play the matching result for the user's own enjoyment or for generating a play list in the user media device for playing certain media items in a certain order.

The Bach DNA will be used in a communication scenario connecting consumers with consumers, artists with artists, artists with consumers in order to calculate/create unique communities. This service can be based on a fee paid by the end user, the Internet service provider or the advertiser for using the advantageous Bach DNA tags included in section 200b of FIG. 8 for the connecting consumers and artists.

Subscription models such as download and streaming, which are based on a flat fee (compulsory or voluntary) or advertisement-based services are allowing end users to access unlimited music and tailor it for the user's personal DNA.

A super distribution extension to the subscription system allowing the consumer to redistribute (share) music in a community with other consumers and artists with similar music DNAs is made possible by the inventive user DNA.

Figure 9:
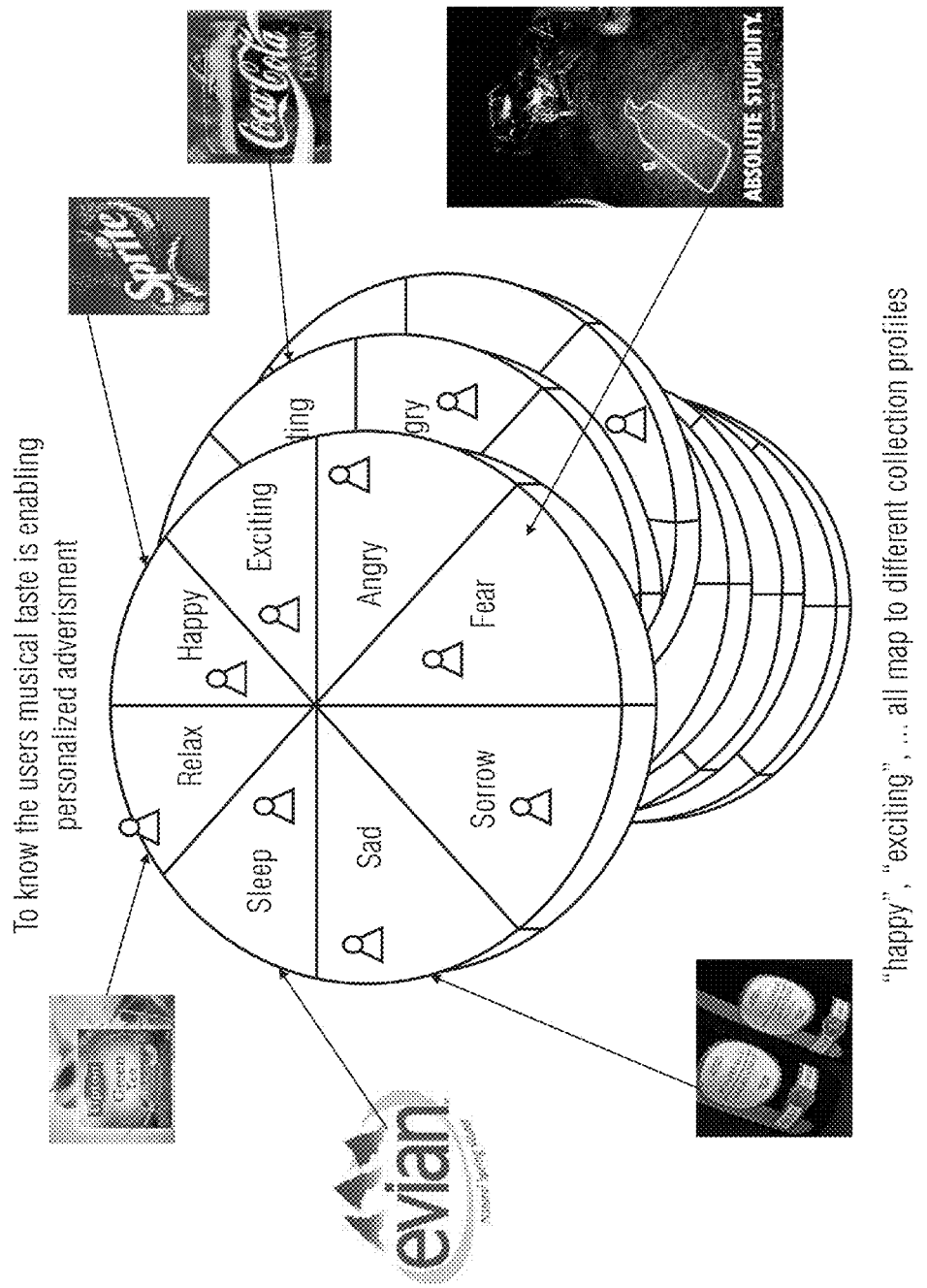
FIG. 9 illustrates an explanation of the application scenario, in which products related to certain collection profiles are selected and advertised.

Bach DNA communities will become interesting targets for advertisers having products matching the profile of a Bach DNA and give more value per click. Such a situation is illustrated in FIG. 9, where, for certain moods, such as relax, exciting, happy, angry, fear, sorrow, sad, certain products illustrated in FIG. 9 are associated. The mood can be a certain explicit feature or can be calculated by a combination of different features. In this case, a rule for combining certain components of a collection profile vector in a certain way results in a certain number, where this number is then mapped to a certain mood. The association of a certain product to a certain mood can be done via a table and the selection of a certain advertisement as soon as a certain product has been identified is straight forward.

Thus, the Bach user DNA together with the Bach DNA tags is the key to perfectly personalized music recommendation.

Shop systems and communities can compare user DNA and thus link to songs, artists and even other users with fitting music taste.

Different to existing statistical solutions, such as "people who have bought this also bought that . . . ", the DNA approach provides a measure which really corresponds to the user and which even works outside of the mainstream and allows up-to-date suggestions.

The Bach user DNA can be applied to user groups to provide several unique services, such as automated music recommendation or self-pushing files in a peer-to-peer (super distribution) scenario. Another service is the analysis of the music taste and of streams within the community, and a further service is the automated generation of live radio streams fitting that taste for a (community) Internet radio and even for background music in bars or clubs depending on their customers profiles, as discussed before.

As already discussed in connection with FIG. 3, item 88, it is a feature of the present invention to enrich a music DNA profile of a sound collection stored in a customer's handset by additional useful information. Such an additional information is, for example, the brand of the handset and the model of the handset as well as the mobile operator connecting the handset to a communication system or to the inventive match-making service. Therefore, the handset brand and model as well as the mobile operator may be identified in real-time. In the new online music world, the handset is the new carrier taking over from the CD. Therefore, the characteristics of the handset and connecting operator may be included in the customer music DNA profile. The advantage is to discover any correlation between type of handset and type of music profile. This provides an added value even more, when the MPEG-21 standard related to digital rights management becomes reality. Like the ID3 V2 tags complement the inventive DNA with identification title and producer/rights holders of a soundtrack, the handset characteristics tags will identify the type of carrier and the name of carrier manufacturer.

The music DNA/collection profile of the user allows exciting application scenarios for a user which are not only related to finding matching user groups, finding matching advertisements or finding songs corresponding to the user taste and, additionally, corresponding to other issues related to the user. The music DNA additionally allows to open completely new scenarios when, for example, two individuals swap their music DNAs. In this situation, a first entity is in the position to experience the world of a second different entity, which can result in astonishing experiences for both users specifically when both users want to learn more about each other. Therefore, a music DNA can be a key feature in building and experiencing an alter ego situation.

The described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

The inventive user collection profile can be stored on a digital storage medium or a machine-readable carrier, in particular, a disc, a DVD or a CD having electronically-readable control signals stored thereon, which co-operate with programmable computer systems such that the user profile is displayed or used for database matching or used for a communication message.

Depending on certain implementation requirements of the inventive methods, the inventive methods can be implemented in hardware or in software. The implementation can be performed using a digital storage medium, in particular, a disc, a DVD or a CD having electronically-readable control signals stored thereon, which co-operate with programmable computer systems such that the inventive methods are performed. Generally, the present invention is therefore a computer program product with a program code stored on a machine-readable carrier, the program code being operated for performing the inventive methods when the computer program product runs on a computer. In other words, the inventive methods are, therefore, a computer program having a program code for performing at least one of the inventive methods when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for generating a collection profile of a collection of different media data items, the media items being audio files, comprising:
   a feature extractor for extracting at least two different features describing a content of a media data item from a plurality of media data items of the collection; and
   a profile creator for creating the collection profile by combining the extracted features or weighted extracted features for the plurality of media data items so that the collection profile represents a quantitative fingerprint of a content of the collection,
   wherein the apparatus further comprises an input for receiving information on a music taste of a user of the collection of different audio files, and
   wherein the profile creator is configured to create a raw collection profile without information on a user behavior logged by the profile creator or information on a music taste, and to weight the raw collection profile using weights derived from the information on the music taste or the user behavior to acquire the collection profile,
   wherein each media data item of the plurality of media data items comprises a data portion and an associated metadata portion, the metadata portion comprising the at least two different features,
   wherein the feature extractor is configured to parse the metadata portion and to read the features from the metadata portion,
   wherein the metadata portion comprises a first non-encrypted part and a second encrypted part,
   wherein the feature extractor is configured to retrieve a decryption key and to decrypt the second encrypted part,
   wherein the profile creator is configured to use more extracted features from the encrypted part than from the non-encrypted part for creating the collection profile, and
   wherein the second encrypted part comprises features describing the content of a media data item more detailed than a feature comprised in the first encrypted part,
   wherein at least one of the feature extractor and profile creator and the input comprises a hardware implementation.

2. The apparatus in accordance with claim 1, in which the profile creator is configured to generate the quantitative collection profile using an addition, a subtraction, a multiplication or a division of the extracted features or the weighted extracted features.

3. The apparatus in accordance with claim 1, in which the collection is stored on a mobile device comprising a storage for media data items; and
   in which the profile creator is configured to add information on a manufacturer of the mobile device or information on a specific model of the mobile device or information on a communication service provider to the collection profile.

4. The apparatus in accordance with claim 1, in which the features describing the content comprise information on energy-strong, energy-mid, energy-low, color-bright, color-dark, tempo/beat, percussiveness, music color, vocal detection, aggressiveness, segmentation, key, mood, solo instrument or fingerprint.

5. The apparatus in accordance with claim 1, in which the profile creator is configured to analyze the extracted features for similar features or to exclude features comprising extreme values.

6. The apparatus in accordance with claim 1, in which the feature extractor is configured to detect a newly stored media data item in the collection, and in which the profile creator is configured to retrieve an earlier collected profile and to manipulate the earlier collected profile based on the features of the newly stored media data item to create an updated collection profile.

7. A method of generating a collection profile of a collection of different media date items, the media items being audio files, comprising:
   extracting at least two different features describing a content of a media date item from a plurality of media data items of the collection; and
   creating, by a profile creator, the collection profile by combining the extracted features or weighted extracted features for the plurality of media date items so that the collection profile represents a quantitative fingerprint of a content of the collection,
   wherein the method further comprises receiving, by an input, information on a music taste of a user of the collection of different audio files, and
   wherein creating comprises: creating a raw collection profile without information on a user behavior logged by the profile creator or information on a music taste, and weighting the
   raw collection profile using weights derived from the information on the music taste or the user behavior to acquire the collection profile,
   wherein each media data item of the plurality of media data items comprises a data portion and an associated metadata portion, the metadata portion comprising the at least two different features,
   wherein the extracting comprises parsing the metadata portion and to read the features from the metadata portion,
   wherein the metadata portion comprises a first non-encrypted part and a second encrypted part,
   wherein the extracting further comprises retrieving a decryption key and to decrypt the second encrypted part,
   wherein the creating further comprises using more extracted features from the encrypted part than from the non-encrypted part for creating the collection profile, and
   wherein the second encrypted part comprises features describing the content of a media data item more detailed than a feature comprised in the first encrypted part.

8. A non-transitory digital storage medium or a non-transitory machine-readable carrier including a computer program comprising a program code for performing, when run on a computer, a method comprising:
   extracting at least two different features describing a content of a media date item from a plurality of media data items of the collection; and
   creating, by a profile creator, the collection profile by combining the extracted features or weighted extracted features for the plurality of media date items so that the collection profile represents a quantitative fingerprint of a content of the collection, wherein the method further comprises receiving, by an input, information on a music taste of a user of the collection of different audio files, and wherein creating comprises: creating a raw collection profile without information on a user behavior logged by the profile creator or information on a music taste, and weighting the raw collection profile using weights derived from the information on the music taste or the user behavior to acquire the collection profile, wherein each media data item of the plurality of media data items comprises a data portion and an associated metadata portion, the metadata portion comprising the at least two different features, wherein the extracting comprises parsing the metadata portion and to read the features from the metadata portion, wherein the metadata portion comprises a first non-encrypted part and a second wherein the extracting further comprises retrieving a decryption key and to decrypt the second encrypted part, wherein the creating further comprises using more extracted features from the encrypted part than from the non-encrypted part for creating the collection profile, and wherein the second encrypted part comprises features describing the content of a media data item more detailed than a feature comprised in the first encrypted part.

9. An apparatus for generating a collection profile of a collection of different media data items, the media items being audio files, comprising:
  a feature extractor for extracting at least two different features describing a content of a media data item from a plurality of media data items of the collection; and
  a profile creator for creating the collection profile by combining the extracted features or weighted extracted features for the plurality of media data items so that the collection profile represents a quantitative fingerprint of a content of the collection,
  wherein the apparatus further comprises an input for receiving information on a music taste of a user of the collection of different audio files, and
  wherein the profile creator is configured to create a raw collection profile without information on a user behavior logged by the profile creator or information on a music taste, and to weight the raw collection profile using weights derived from the information on the music taste or the user behavior to acquire the collection profile,
  wherein the first feature describes a first content characteristic by a first number in a first number range,
  wherein the second feature describes a second different content characteristic by a second number in a second number range, and
  wherein the profile creator is configured to combine the first numbers of the plurality of media data files to acquire a combined first number,
  wherein the profile creator is configured to combine the second numbers of the plurality of media data files to acquire a combined second number, and
  wherein a vector having the combined first number or a derived first number derived from the combined first number, and having the combined second number or a derived second number derived from the combined second number comprises the content profile,
  wherein at least one of the feature extractor and profile creator and the input comprises a hardware implementation.

10. The apparatus in accordance with claim 9, wherein the combined number is a number within a number range being the same as a number range of the corresponding feature or being smaller than the number range of the corresponding feature.

11. A method of generating a collection profile of a collection of different media date items, the media items being audio files, comprising:
  extracting at least two different features describing a content of a media date item from a plurality of media data items of the collection; and
  creating, by a profile creator, the collection profile by combining the extracted features or weighted extracted features for the plurality of media date items so that the collection profile represents a quantitative fingerprint of a content of the collection,
  wherein the method further comprises receiving, by an input, information on a music taste of a user of the collection of different audio files, and
  wherein the creating comprises creating a raw collection profile without information on a user behavior logged by the profile creator or information on a music taste, and weighting the raw collection profile using weights derived from the information on the music taste or the user behavior to acquire the collection profile,
  wherein the first feature describes a first content characteristic by a first number in a first number range,
  wherein the second feature describes a second different content characteristic by a second number in a second number range, and
  wherein the creating comprises combining the first numbers of the plurality of media data files to acquire a combined first number,
  wherein the creating comprises combining the second numbers of the plurality of media data files to acquire a combined second number, and
  wherein a vector having the combined first number or a derived first number derived from the combined first number, and having the combined second number or a derived second number derived from the combined second number comprises the content profile.

12. A non-transitory digital storage medium or a non-transitory machine-readable carrier including a computer program comprising a program code for performing, when run on a computer, a method comprising:
  extracting at least two different features describing a content of a media date item from a plurality of media data items of the collection; and
  creating, by a profile creator, the collection profile by combining the extracted features or weighted extracted features for the plurality of media date items so that the collection profile represents a quantitative fingerprint of a content of the collection,
  wherein the method further comprises receiving, by an input, information on a music taste of a user of the collection of different audio files, and
  wherein the creating comprises creating a raw collection profile without information on a user behavior logged by the profile creator or information on a music taste, and weighting the raw collection profile using weights derived from the information on the music taste or the user behavior to acquire the collection profile,
  wherein the first feature describes a first content characteristic by a first number in a first number range, wherein the second feature describes a second different content characteristic by a second number in a second number range, and wherein the creating comprises combining the first numbers of the plurality of media data files to acquire a combined first number, wherein the creating comprises combining the second numbers of the plurality of media data files to acquire a combined second number, and wherein a vector having the combined first number or a derived first number derived from the combined first number, and having the combined second number or a derived second number derived from the combined second number comprises the content profile.

* * * * *

UNITED STATES PATENT AND TRADEMARK OFFICE
CERTIFICATE OF CORRECTION

PATENT NO. : 8,407,224 B2
APPLICATION NO. : 13/035083
DATED : March 26, 2013
INVENTOR(S) : Dagfinn Bach et al.

It is certified that error appears in the above-identified patent and that said Letters Patent is hereby corrected as shown below:

In the Claims

Claim 8, Column 21, Lines 16-19 should read as follows:

wherein the metadata portion comprises a first non-encrypted part and a second encrypted part, wherein the extracting further comprises retrieving a decryption key and to decrypt the second encrypted part, Signed and Sealed this
Thirteenth Day of August, 2013

Teresa Stanek Rea
*Acting Director of the United States Patent and Trademark Office*